United States Patent [19]

Claesson

[11] 4,267,819
[45] May 19, 1981

[54] DEVICE FOR GENERATING AN ELECTRIC OUTPUT SIGNAL IN RESPONSE TO THE POSITIONING OF A MECHANICAL MEMBER

[76] Inventor: Per-Göran Claesson, Österhagens gård, 142 00 Trangsund, Sweden

[21] Appl. No.: 56,338

[22] Filed: Jul. 10, 1979

[30] Foreign Application Priority Data

Jul. 19, 1978 [SE] Sweden ................ 7808001

[51] Int. Cl.³ .................. F23L 11/00; F23N 3/02
[52] U.S. Cl. .................. 126/285 B; 110/163; 250/231 P; 250/206; 350/96.2; 431/20
[58] Field of Search ............... 250/231 R, 231 P, 206; 431/19, 20, 76; 350/96.2; 126/285 B; 110/163; 236/45

[56] References Cited

U.S. PATENT DOCUMENTS

| | | | |
|---|---|---|---|
| 3,748,486 | 7/1973 | Russell | 250/231 R |
| 3,931,514 | 1/1976 | Patterson | 250/206 |
| 4,087,684 | 5/1978 | Mott | 250/231 R |
| 4,102,627 | 7/1978 | Reed | 431/20 |
| 4,150,870 | 4/1979 | D'Auria | 350/96.20 |

FOREIGN PATENT DOCUMENTS

2016498  4/1970  Fed. Rep. of Germany ..... 350/96.2

*Primary Examiner*—Herbert F. Ross
*Attorney, Agent, or Firm*—Burns, Doane, Swecker & Mathis

[57] ABSTRACT

A device for generating an electric output signal in response to the positioning of a mechanical member. The mechanical member carries an optical fibre, and the optical fibre coacts with one of several, preferably two, phototransistors in response to the setting position of the mechanical member. The phototransistors are connected to an amplifier generating the electric output signal corresponding to the member's position.

The device may be used in control equipment for controlling the draught in a boiler, preferably an oil-fired boiler.

8 Claims, 3 Drawing Figures

DEVICE FOR GENERATING AN ELECTRIC OUTPUT SIGNAL IN RESPONSE TO THE POSITIONING OF A MECHANICAL MEMBER

FIELD OF THE PRESENT INVENTION

The present invention relates to a device for generating an electric output signal in response to the positioning of a mechanical member.

BRIEF DESCRIPTION OF THE PRIOR ART

It is already known that there is a need in a plurality of different fields of application to be able to generate an electric output signal for controlling different means, and where the generated electric output signal should be directly related or responsive to the positioning and/or displacement of a mechanical member. Within many of the technical fields of application where these devices are used, it has been found that the force which is available and which acts on the mechanical member to cause it to alter its position is very small, and therefore the use of this force to directly activate an electrical contact is entirely out of the question. Particularly in sensitive fields of application, the available movement of the member is very limited, and the available force is small.

In order to master the problems occurring in the above-mentioned fields of application, it has been natural to search for the solution amongst non-tactile switching means such as switches controlled by magnetism, photo cells and the like.

Thus, devices in the prior art, known per se, can give a non-tactile indication of the positioning of a mechanical member, and in certain cases a small force is sufficient, but the devices of this kind known up to now have been so formed that the movement of the mechanical member must be quite considerable before any effect occurs to provide the electric output signal. Furthermore, considerable forces are required in some non-tactile switches, and these forces must act on the mechanical member.

OBJECTS OF THE PRESENT INVENTION

The present invention relates to a device of such a nature that it can generate an electric output signal in response to the positioning and/or displacement of a mechanical member where the force which acts on the mechanical member to displace it is very small. Nonetheless, a very small displacement or alteration in position of the mechanical member will generate a large alteration in the electrical output signal.

One field of application for a device in accordance with the invention having the characterizing features given above, and where particularly high demands are made on the functional reliability of the device, is in control equipment for enabling control of a subpressure (draught) in a boiler (heating equipment), preferably an oilfired boiler.

In such an application it has been found that the control equipment must regulate the subpressure in the boiler within the range of 0–1.5 mm water column, preferably about 1 mm water column, and with an accuracy in the order of magnitude of 1% or less.

In such control equipment it has been found that the force which positions of the mechanical member and which varies in response to the variation in subpressure is very small, and the sensing member must be very sensitive. Consideration should be paid at the same time to the fact that the electric output signal must be able to drive control equipment and displace a damper upwards and downwards for changing the subpressure in the boiler within approved limits to a set value, in response to the positioning and/or displacement of the mechanical member.

DESCRIPTION OF THE ACCOMPANYING DRAWINGS

A presently proposed embodiment having the characterizing features of the present invention will now be described in detail while referring to the attached drawings, in which FIG. 1 is a section through the device where an electric output signal is generated in response to the positioning and/or displacement of a mechanical member, FIG. 2 illustrates, extremely simplified, control equipment with which a device in accordance with FIG. 1 is associated and FIG. 3 illustrates an electrical circuit arrangement usable in the control equipment illustrated in FIG. 2.

DESCRIPTION OF PREFERRED EMBODIMENT

Figure 1:
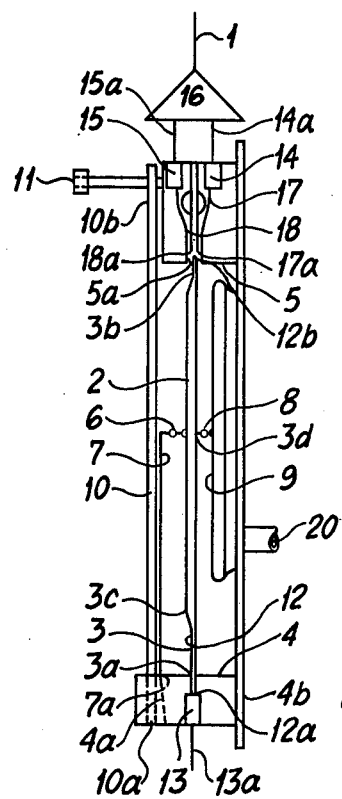

FIG. 1 illustrates a device for generating an electrical output signal in a lead 1 in response to the positioning and/or displacement of a mechanical member, denoted by the reference numeral 2.

The mechanical member 2 consists of an elongate strip 3, one end 3a being attached to a holder 4, and the other end 3b being feely movable in a slit 5a formed in a second holder 5. The end extends a distance into the slit 5a. There are two parallel edges 3c stiffening the strip and arranged along the major portion of the central part of the strip. These edges 3c can form a V-shape. At its central part 3d, the strip 3 is attached via a first link 6 to a spring 7, biassed away from the plane of the strip 3, and via a second link 8 the strip is attached to a means, in the form of a diaphragm 9, actuating the member 2 with the small force. The first link 6 and the second link 8 comprise a narrow chain which passes through the middle part 3d, but is attached to the middle part 3d via fastening means known per se. The spring 7 is attached at one end 7a in a recess 4a formed in the holder 4, and is given spring bias by a bridge 10 extending between the holder 5 and holder 4. A portion 10a of the bridge is inserted in the recess 4a and mounted in the recess together with one end 7a of the spring. The left wall of the recess 4a (as viewed in FIG. 1) is parallel to the strip 3 or base plate 4b, and the opposite wall of the recess is formed at an incline, so that the recess tapers towards the middle of the spring. The size of the narrow portion of the recess is dimensioned to press the spring 7 into engagement with the bridge 10, and forms a pivot point for the bridge and spring. With the aid of a screw 11, extending through the bridge part 10b, this part can be moved relative to the holder 5. When the bridge 10 is moved away from the holder 5 with the aid of the screw 11, and the end 7a of the spring is pivoted to the right of the recess 4a, which means that the spring 7 provides a greater bias to displace the links 6 and 8 from the diaphragm 9 and thereby adjust the strip 3 in its intermediate position in the slit 5a.

The mechanical member 2 carries an optical fibre 12 extending along the strip 3, one end 12a of the fibre being illuminated by a light emitting diode 13 (LED) while its other end 12b terminates at the part 3b situated in the slit 5a. The LED is supplied with power by a lead 13a. In response to the adjustment position of the member 2, the optical fibre end 12b coacts with one of several, preferably two, phototransistors 14 and 15. These phototransistors are connected to an amplifier 16 via a lead 14a and a lead 15a. The amplifier generates the electric output signal on the lead 1 corresponding to the position of the member 2.

The one end surface 12a of the optical fibre 12 is thus illuminated via the LED 13, and the other end surface 12b may coact either with a second optical fibre 17 or with a third optical fibre 18. The second optical fibre 17 is connected to the first phototransistor 14, while the third optical fibre 18 is connected to the second phototransistor 15. The first and second phototransistors are connected to an operational amplifier 16.

The second end surface 12b of the optical fibre 12 is arranged to pass from one end surface 17a to the other end surface 18a of the second and third optical fibres 17 and 18 respectively, or be situated therebetween, in response to the movement of the mechanical member 2, although it is not allowed to pass beyond these end surfaces. These end surfaces are situated in the slit 5a. Light transfer may thus be accomplished either to both, to a greater or less degree, or to only the second or the third optical fibre, and this is done in dependance on the position of the member 2 and its other end 3b. The first and second phototransistors are connected in series, for compensating incoming disturbing light, and to compensate the effect of temperature variations in the phototransistors, the centre terminals are connected to the amplifier 16.

Since the operational amplifier is very sensitive to the signals on the leads 14a and 14b, it has been found necessary in practice to arrange the amplifier with a strong negative feedback, so that the electric output signal in the lead 1 will be dampened in relation to the signal which will otherwise be present on the lead 1 in response to positioning or displacement of the member 2.

Figure 2:
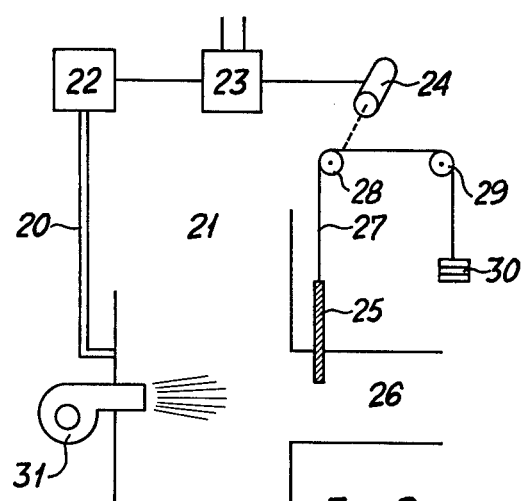

The invention also comprises a device according to FIGS. 1 and 2 utilizing control equipment. This control equipment is particularly intended to regulate the subpressure in a boiler (heating equipment for houses), preferably an oil-fired boiler. In such an application, the diaphragm 9 with the aid of its pipe 20, will be connected to a hose, sensing a subpressure in the boiler 21. The device illustrated in FIG. 1 has been given the reference designation 22 in FIG. 2. The output signal 1 is transferred to an electronic circuit 23, which in turn drives a motor 24 in one of two directions, depending on whether a draught valve (flap) 25 is to close the flue gas duct 26 or open it. For displacement upwards and downwards in the duct, the valve 25 is attached to one end of a cord 27, running over two pulleys 28 and 29, the other end of the cord being attached to a counterweight 30. An oil-firing unit for the boiler is denoted by the numeral 31.

When the unit 31 is started, the valve 25 will be in the fully open position and thereafter will be closed successively until a set sub-pressure is obtained. The electronic circuit 23 controls the electric motor 24 so that its direction of rotation and rpm will be controllable via triac circuits.

Figure 3:
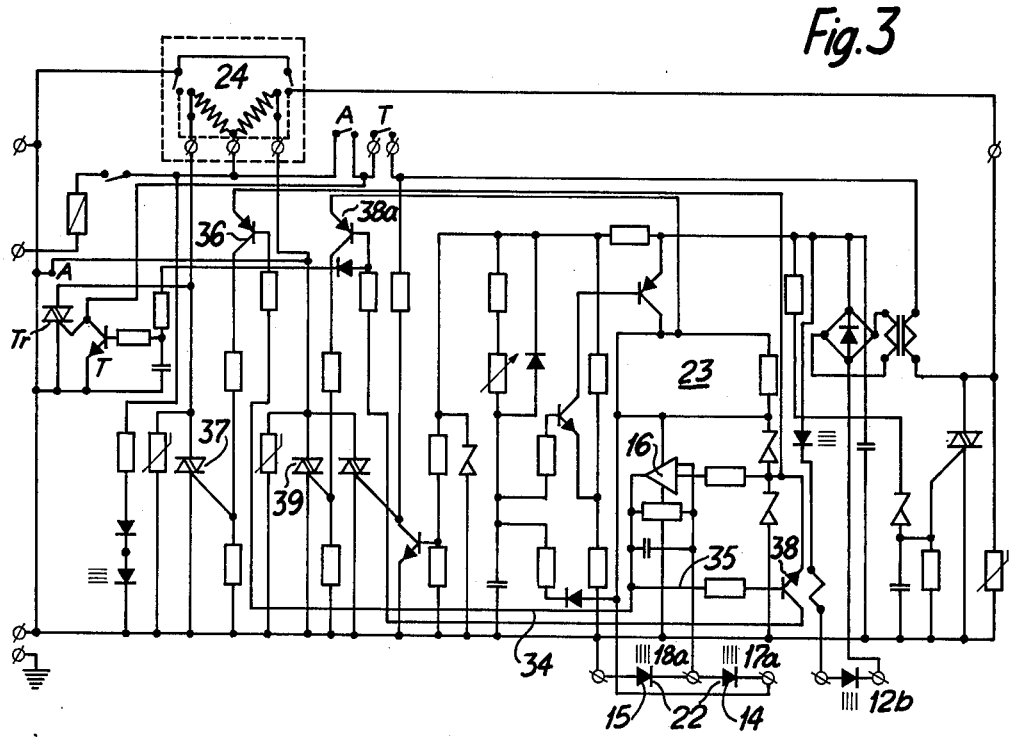

The electrical circuit diagram of the control equipment in accordance with FIG. 2 is shown in FIG. 3. The displacement indicating device has been given the reference numeral 22 in FIG. 3 also, and the motor has been given the numeral 24, while the rest of the circuit diagram relates to the electronic circuit. FIG. 3 illustrates the leads and components comprising the electronic apparatus, which also includes the operational amplifier 16. The amplifier 16 can be of the type having the designation "741". The output signal from the amplifier is applied on the lead 34 and on the lead 35 (reference numeral 1 in FIG. 1). Signals on the lead 34 control the motor 24 in one direction, via a transistor 36 and a triac 37. Signals on the lead 35 control the motor in the opposite direction via a transistor 38, a transistor 38a and a triac 39.

When a predetermined temperature has been arrived at, the thermostat T cuts out. The valve 25 is thereby closed completely, since the mains voltage is broken off the transistor T, FIG. 3, so that the triac Tr becomes energized and drives the motor until the valve closes completely.

The switch A, having an opening and closing function, is actuated manually, e.g. during chimney-sweeping, causing the valve to open end the current to the rest of the apparatus to be broken.

The rest of the resistances, capacitors and semi-conducting elements, which are required to enable the electronic circuit 23 to work in a desirable mode, are shown in FIG. 3. Since these circuits do not constitute any part of the present invention, and are known to those skilled in the art, these parts will not be more fully described.

Finally, it should be noticed that the operational voltage is the same for the phototransistors as for the operational amplifier.

The two phototransistors 14 and 15 are coupled in series in relation to the supply voltage.

The invention is naturally not limited to the embodiment described above by way of an example, but can be modified within the scope of the present inventive concept.

What is claimed is:

1. Apparatus for controlling the draft in an oil-fired boiler unit, comprising:
    a valve for controlling the flow of air through the boiler;
    a diaphragm operatively connected to the boiler such that its position is responsive to the pressure in the boiler;
    a movably mounted elongate strip connected to said diaphragm for movement therewith;
    a spring biasing said elongate strip away from said diaphragm;
    a first optical fiber disposed on said elongate strip;
    a source of illumination provided at one end of said first optical fiber;
    at least two additional optical fibers spaced from one another and disposed adjacent the other end of said first optical fiber such that the amount of light from said source of illumination that is transmitted to each of said additional optical fibers by said first optical fiber is dependent upon the position of said elongate strip;
    at least two phototransistors connected in series and respectively disposed adjacent said additional optical fibers to receive light transmitted thereby;
    an operational amplifier having an input terminal connected to the common junction of said phototransistors, to thereby provide compensation for ambient light and temperature conditions, and providing an output signal related to the position of said elongate strip; and a regulating circuit responsive to the output signal from said operational amplifier to control the position of said valve.

2. The apparatus of claim 1, wherein said elongate strip is connected to said diaphragm and to said spring by a chain.

3. A device as claimed in claim 1, characterized in that the operational amplifier is provided with a large negative feedback.

4. A device as claimed in claim 1, characterized in that the spring is fixed at one end and is provided with its spring bias via a bridge.

5. A device as claimed in claim 4, characterized in that the bridge is pivotably mounted at one end of the spring.

6. A device as claimed in claim 1, characterized in that the valve is completely open when the oil-fired unit is started, and closes successively until preselected subpressure is obtained.

7. A device as claimed in claim 1, characterized in that an electric motor regulates the position of the valve, and that the rpm and direction of rotation of the motor are controlled via triac circuits incorporated in the regulating circuit.

8. A device as claimed in claim 1, characterized in that when the oil-firing unit stops, the valve is closed completely.

* * * * *